United States Patent
DeMartino

(10) Patent No.: US 7,149,210 B2
(45) Date of Patent: Dec. 12, 2006

(54) WIDE AREA MULTI-SERVICE COMMUNICATIONS NETWORK BASED ON DYNAMIC CHANNEL SWITCHING

(76) Inventor: Kevin A. DeMartino, 10 Mitchell Grant Way, Bedford, MA (US) 01730

( * ) Notice: Subject to any disclaimer, the term of this patent is extended or adjusted under 35 U.S.C. 154(b) by 1112 days.

(21) Appl. No.: 10/112,327

(22) Filed: Mar. 29, 2002

(65) Prior Publication Data

US 2002/0141400 A1 Oct. 3, 2002

Related U.S. Application Data

(60) Provisional application No. 60/280,518, filed on Apr. 2, 2001.

(51) Int. Cl.
*H04L 12/64* (2006.01)
(52) U.S. Cl. .......................... 370/353; 370/370
(58) Field of Classification Search ................ 370/352, 370/353, 370
See application file for complete search history.

(56) References Cited

U.S. PATENT DOCUMENTS

| | | | |
|---|---|---|---|
| 2002/0080828 A1* | 6/2002 | Ofek et al. ................. | 370/539 |
| 2002/0124104 A1* | 9/2002 | Rappaport et al. .......... | 709/238 |

OTHER PUBLICATIONS

S. Pandhi, "The Universal Data Connection", IEEE Spectrum, Jul. 1987, pp. 31-37.
Y. Lin, et al., "Fiber-Based Local Access Network Architectures", IEEE Communications Magazine, vol. 27, No. 10, Oct. 1989.
E. Rosen et al., "Multiprotocol Label Switching Architecture", IETF Network Group, RFC 3031, Jan. 2001, pp. 1-54.
A. Banerjee, et al., "Generalized Multiprotocol Label Switching An Overview of Routing and Management Enhancements", IEEE Communications Magazine, vol. 39, No. 1, Jan. 2001.
G. Hawley, "Historical Perspectives on the U.S. Telephone Loop", IEEE Communications Magazine, vol. 29, No. 3, Mar. 1991, pp. 24-28.
J. Martin, Telecommunications and the Computer, Englewood Cliffs, New Jersey: Prentice Hall, 1976, p. 419.
A. Modarressi and R. Skoog, "Signaling System No. 7: A Tutorial", IEEE Communications Magazine, vol. 28, No. 7, Jul. 1990, pp. 19-20; 22-35.

(Continued)

*Primary Examiner*—Melvin Marcelo
(74) *Attorney, Agent, or Firm*—Holland & Hart, LLP

(57) ABSTRACT

A networking approach is disclosed that combines the advantages of circuit switching and packet switching in an integrated communications network. With this approach, control signals are separated from the data and transmitted separately in a common control channel. Control and signaling operation can be viewed as a logical extension of generalized multi-protocol label switching (GMPLS). A variable number of data channels are dynamically assigned to each connection through the network. Channels are quickly switched in to accommodate the data flow through a connection and switched out when they are no longer needed. With this dynamic channel switching approach, a continuous data stream is not altered as it transverses the network and data channels are efficiently utilized even if the data source is bursty. The proposed approach is compatible with legacy networks and can provide a mechanism for convergence of circuit switching and packet switching. Most of the benefit of the proposed approach can be achieved with modifying only network and server equipment, but not necessarily client equipment, to support dynamic channel switching.

7 Claims, 10 Drawing Sheets

OTHER PUBLICATIONS

T. Bartee, editor, Digital Communications, Indianapolis, Indiana: Howard W. Sams & Co., 1986, p. 118.

A. Day, "International Standardization of BISDN", IEEE LTS—The Magazine of Lightwave Telecommunication Systems, vol. 2, No. 3, Aug. 1991, pp. 13-20.

W. Stallings, Data and Computer Communications (sixth edition), Upper Saddle River, New Jersey: Prentice Hall, 2000, pp. 536-537.

W. Stallings, op. cit., pp. 573, 578-582.

W. Stallings, Local Networks, New York: Macmillan Publishing Company, 1984, one (1) page.

C. Omidyar and A. Aldridege, "Introduction to SDH/SONET", IEEE Communications Magazine, vol. 31, No. 9, Sep. 1993, pp. 30-33.

J. Martin, "Telecommunications and the Computer", op. cit., p. 241.

J. Lyles and D. Swinehart, "The Emerging Gigabit Environment and the Role of Local ATM," IEEE Communications Magazine, vol. 30, No. 4, Apr. 1992, pp. 52-58.

P. Pancha and M. El Zarki, "MPEG Coding For Variable Bit Rate Video Transmission", IEEE Communications Magazine, vol. 30, No. 4, May 1994, pp. 54-66.

T. Sikora, MPEG-1 and MPEG-2 Digital Video Coding Standards http://www.am.hhi.de/mpeg-video/papers/sikora/mpeg1_2/mpeg1_2.htm, downloaded oct. 3, 1997, pp. 1-22.

K. DeMartino, "ISDN and the Internet:, Computer Networks—The Journal of Computer and Telecommunications Networking", vol. 31, Dec. 1999, pp. 2325-2339.

\* cited by examiner

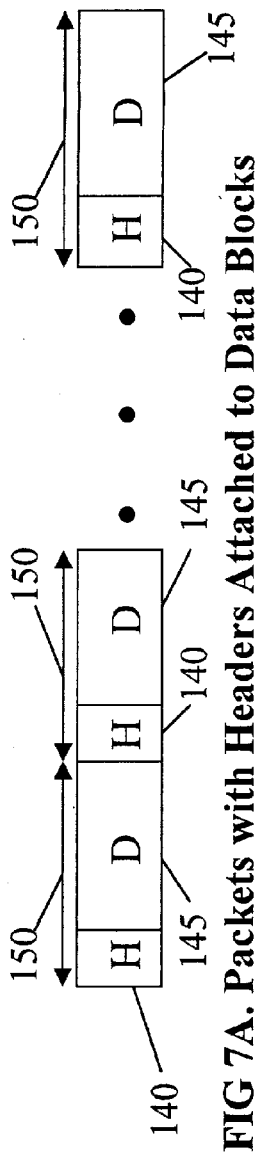
FIG 7A. Packets with Headers Attached to Data Blocks
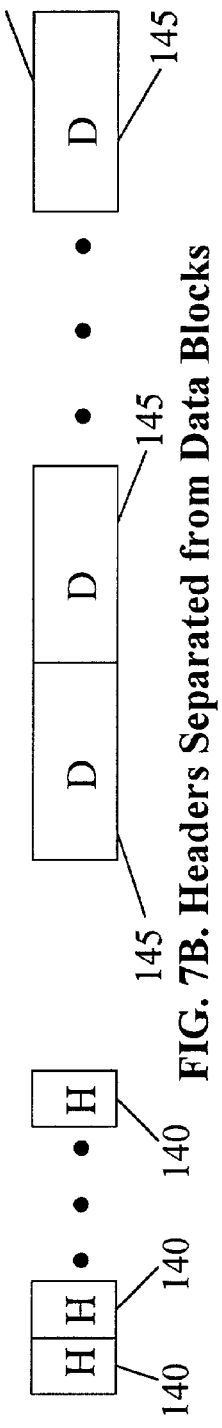
FIG. 7B. Headers Separated from Data Blocks
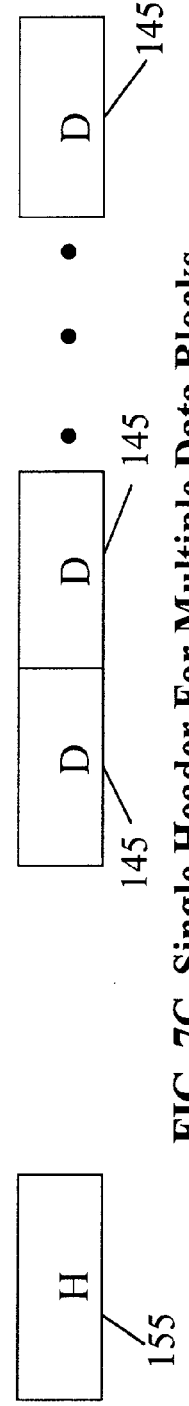
FIG. 7C. Single Header For Multiple Data Blocks
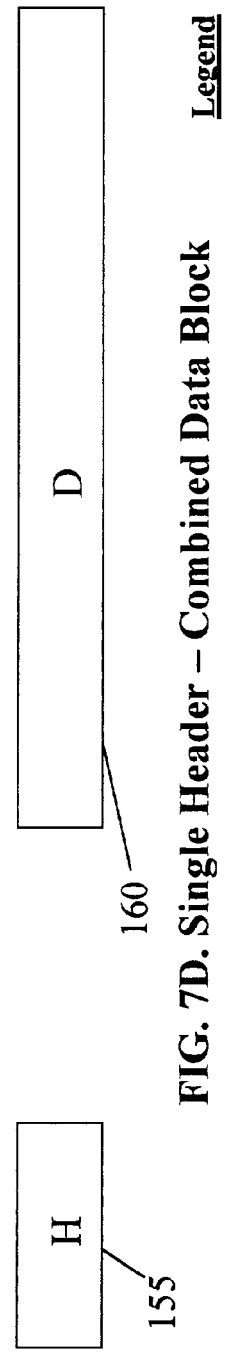
FIG. 7D. Single Header – Combined Data Block
Legend
H - Header
D - Data

WIDE AREA MULTI-SERVICE COMMUNICATIONS NETWORK BASED ON DYNAMIC CHANNEL SWITCHING

REFERENCE TO PENDING PRIOR PATENT APPLICATION

This patent application claims benefit of now abandoned prior U.S. Provisional patent application Ser. No. 60/280,518, filed Apr. 2, 2001 by Kevin A. DeMartino for COMBINING THE ADVANTAGES OF CIRCUIT SWITCHING AND PACKET SWITCHING IN A COMMUNICATIONS NETWORK, which patent application is hereby incorporated herein by reference.

FIELD OF THE INVENTION

This invention is related to communications networking apparatus and methods in general, and more particularly to apparatus and methods for dynamic switching of communications channels.

BACKGROUND OF THE INVENTION

The Goal of an Integrated Communications Network

In the past, a communications network was usually designed to provide a specific communication service. Networks designed around a specific service include: the telephone networks, which were designed to support voice over circuit switched connections; the cable television (TV) networks, which were designed to provide broadcast video; and the Internet, which was designed to support computer communications using packet switching. Subscribers needed to access multiple networks in order to obtain a full range of communication services.

For both clients and servers, access to the Internet has usually been provided by circuit switched connections through the telephone networks. Typically, a client is connected to an Internet service provider (ISP) via a dial-up connection, which usually involves a local (non-toll) call over a relatively short distance. For servers, both dial-up and permanent (leased line) connections to ISPs over relatively short distances are common. Data is packet switched as it traverses the Internet from the client's ISP to the server's ISP and vice versa. Very long distances can be covered by data flows through the Internet, with most of the data flowing in the direction from the sever to the client, which is usually referred to as the downstream direction.

It is desirable to have a common, integrated network that can provide each subscriber with a full range of communication services over a single broadband access line. The capacity provided to each subscriber should be sufficient to accommodate full motion video among other high data rate communication functions. High speed network access can be provided over twisted pair telephone lines using digital subscriber line (DSL) techniques or over TV cable using hybrid fiber-coax techniques. The current DSL and HFC (cable modem) implementations provide high speed access to Internet servers, which can supply audio and video streams in addition to supporting traditional computer data communications, i.e., file transfers. With these approaches, integrated services can be supported, however, the supporting networks are not fully integrated. The various networks, including the DSL and HFC access networks, the circuit-switching voice networks, the broadcast video networks, and the packet-switching Internet, interface with each other. However, these network maintain distinct identities. The integration of network services is hampered by the fact that some services, such as voice, are currently based on circuit switching, while other services, such as file transfers, are currently based on packet switching.

With integrated services digital networks (ISDN), an attempt was made to establish integrated networks that could support both voice and data communication services. Narrowband ISDN is primarily based on circuit switching with 64 Kb/s channels assigned to particular connections. The subscriber data rates that can be supported by narrowband ISDN interfaces are relatively low, and consequently, the video capabilities of ISDN are very limited. Broadband ISDN (B-ISDN) was designed to provide data rates that could easily support the full range of services, including full motion video. B-ISDN is based on a form of packet switching called Asynchronous Transfer Mode (ATM). ATM was designed to transport all types of data (e.g., voice, video, or computer files) using small, fixed size cells.

B-ISDN with ATM has not lived up to its promise and has not been generally accepted as solution to the integrated services problem. Instead, another approach, which leverages the success of the Internet, is based on packet switching and the Internet Protocol (IP). This IP-centric approach has gained widespread acceptance. However, in order to achieve the network performance needed for integrated services, additional protocols beyond IP are required. The leading approach for providing the required performance is based on multi-protocol label switching (MPLS). MLSP moves the integrated network away from the connectionless paradigm of IP and make the integrated services network not quite IP-centric.

Convergence of Circuit Switching and Packet Switching

An integrated services network can be based on circuit switching, as used in narrowband ISDN, or on packet switching, as used in B-ISDN or IP-centric networks. Another alternative approach, which is the approach followed here, would involve the convergence of circuit switching and packet switching techniques.

Circuit switching networks, such as the telephone networks, establish end-to-end physical layer connections through the network. Transmission resources, i.e., channels, are dedicated to a particular connection for the duration of a call. With circuit switching, delays are minimized and fixed. A stream of data can be transported through a circuit switching network without suffering any distortion. Also, the processing performed by a circuit switching network is relatively simple and straightforward. On the other hand, the utilization of dedicated channels can be low if there is a significant variation in the data rate. Consequently, circuit switching networks are inefficient for transporting bursty data.

With packet switching, transmission resources are dynamically shared based on demand. This makes packet switching efficient for transporting bursty data, such as the data flows associated with file transfers. However, packet switching introduces randomly varying delays into the data stream, which can be problematic for the transmission of continuous data, such as voice and video data streams. Also with packet switching, decisions with respect to switching (or forwarding) of packets must be made on the fly based on information contained in the packet header. This complicates data processing in the network.

The Internet Engineering Task Force (IETF) is developing network control and signaling standards based on MPLS that apply to both circuit switching and packet switching. This set of standards, which fall under the collective heading of generalized MPLS (GMPLS), move networks away from connectionless packet switching to a more connection-oriented operation and foreshadow the convergence of circuit switching and packet switching.

Operation of Circuit Switching Networks

Circuit switching techniques have been employed by telephone networks for over 100 years. FIG. 1 illustrates the operation of a circuit switching network 5. End-to-end physical layer connections are established between subscriber nodes 10, which include client nodes 15 and server nodes 20. Some nodes may be configured to include both client functions and server functions. For voice operation, a connection is established between peer nodes when one subscriber "calls" another. Data transfers usually involve a connection between a client and a server, with most of the data flowing downstream from the server to the client.

Each subscriber node has a permanent, dedicated connection 30 to the network, which usually consists of a pair of copper wires that are twisted together. In the old days a connection was established between subscriber lines by physically linking wires together through a series of patch panels or electro-mechanical switches so that a closed circuit was formed with electric current flowing from a subscriber on one end through the network to a subscriber on the other end, and back again. In today's networks, the subscriber line on each end is connected to a network channel and channels are linked together through a switched connection 35 over the network to form a continuous end-to-end channel, or connection. Although the process of establishing this end-to-end connection is still called "circuit switching", "channel switching" would be a more accurate description of what actually takes place within the network. Channels forming the end-to-end connection are dedicated for the duration of the call.

To cause a connection to be set up or released, a subscriber must signal the network. Similarly, control signals must be transmitted within the network to cause channels to be assigned to a particular connection. Control signals can be associated with a particular data channel and transmitted in the channel along with the data. Alternately, a common signaling channel can be used to control multiple data channels. Channel-associated signaling is employed when a subscriber dials the telephone to provide the network with the information (the telephone number) it needs to establish a connection. In this case, signaling information is sent from the subscriber to the network in the same band (or channel) used for voice transmission. Within telephone networks, control information is usually transferred between nodes over a common signaling channel using the Signaling System Number 7 (SS7) set of protocols. Network control signals may follow different paths than the data they are controlling.

With the advent of ISDN, common channel signaling was extended to the user-to-network interface (UNI). ISDN provides the user with a separate signaling channel, the D channel, which is used to control the assignment of data transfer channels (B channels) to a particular connection. Using the D channel signaling, the subscriber can request that the network allocate additional B channels to an active connection. Unfortunately, most narrowband ISDN interfaces provide only two B channels to a subscriber, which greatly limits the utility of narrowband ISDN. With B-ISDN, data rates and the number of equivalent data channels are greatly increased. However, B-ISDN inexplicably rejected common channel signaling in favor of ATM.

Data is usually transferred digitally through circuit switching networks. With the telephone networks, analog data is usually converted to digital form at the local central office (CO). In the case of ISDN, and other digital lines, data is already in digital form at the subscriber interface.

Delays through circuit switching networks are minimal and fixed. There may be some small buffering delays, but except for local traffic, these are usually small compared to unavoidable propagation delays. If the bit error rate is low, which is normally the case, then data will be transported through a circuit switching network without distortion. This situation is illustrated by FIGS. 2A and 2B, where an output data stream 40 exiting the network is identical to an output data stream 45 entering the network except for a small fixed delay 50. This property of the network is important for continuous data streams, such as those produced by voice and video sources, which can be adversely affected by variable delays.

Quality of service (QOS) measures include data rates, delays, delay variations, and error rates. A circuit switching networks can provide a guaranteed QOS with a fixed data rate, a low fixed delay, and without errors due to lost or out of order data. These characteristics make circuit switching operation compatible with legacy networks and most data sources.

Compared to packet switching, circuit switching is relatively simple and straightforward to implement. Circuit switched channels, such as Synchronous Optical Network (SONET) or Synchronous Digital Hierarchy (SDH) channels, can be readily aggregated, which makes circuit switching networks scalable. If the data rates are high enough, it would be practical to implement circuit switching with optical components, which is currently not an option for packet switching.

The primary disadvantage of circuit switching is that it is inefficient for transporting bursty data. Channels with sufficient capacity to handle the required peak data rate for a particular connection must be dedicated to that connection. If the data rate is bursty, i.e., the peak data rate is much greater than the average data rate, then the channels assigned to a connection will be underutilized most of the time. This is particularly true for human initiated file transfers, which tend to be very intermittent and where the utilization may be a few percent or less. For applications involving continuous data flows, such as voice or streaming audio/video, the percentage variation in the data rate is much less than the percentage variation for file transfers. Consequently, circuit switching is much more efficient for continuous data sources than it is for intermittent sources.

Operation of Packet Switching Networks

Packet switching operation involves breaking up data blocks into smaller blocks, or packets, which contain header and trailers in addition to the data. Packets are switched through the network based on information provided in the packet headers. With packet switching, transmission resources (channels) are dynamically shared by multiple data sources rather than being dedicated to a single source. This makes packet switching more efficient than circuit switching for transporting bursty data. A broad definition of packet switching would include networks based on the Transmission Control Protocol (TCP)/Internet Protocol (IP), X.25, Frame Relay, Ethernet, and ATM.

The Internet can be viewed as a large number of packet switching networks interconnected by routers. These routers use IP as a common protocol for transferring packets through the Internet. Within the subnets that constitute the Internet, a diverse set of protocols, including X.25, Frame Relay, or ATM, are used for transferring packets.

FIG. 3 illustrates how clients 15 and servers 20 are connected to the Internet 55 through the telephone networks 60. Clients 15 typically establish dial-up circuit switched connections 35 with Internet service providers (ISPs), which are shown as server nodes 20. Servers may be connected to the Internet by dial-up lines (as shown in FIG. 3) or by leased lines, or in some cases, servers may be co-located with ISPs.

The IP router at an ISP's point of presence (POP) can be considered to be the point of entry to the Internet. Within the Internet, routers are usually connected to each other by leased lines contained within trunks. If these leased lines are viewed as part of the telephone networks, then data flowing through the Internet would flow into and out of the telephone networks as illustrated by FIG. 3. Even within the individual packet switching networks of the Internet, resources leased from the telephone networks are often used to establish physical connections. To simplify FIG. 3, these connections are shown as remaining within the Internet. From the perspective of FIG. 3, the Internet is viewed as being implemented on top of the telephone networks with the Internet being highly dependent on the telephone networks.

The primary rationale for packet switching networks, in general, and the Internet, in particular, is that they do not require dedicated end-to-end connections between clients and servers. For the most part, physical connections would be shared rather than dedicated. In FIG. 3, the physical connection from the client to the Internet (ISP POP), which typically would cover a distance of several miles, would usually be dedicated to the flow of data between a single client and a single server. Physical connections through the Internet, which could cover a distance of thousands of miles, would be shared by many client/server data flows. For most servers, the physical connection between the server and the Internet would be shared could be shared by multiple data flows. Thus, packet switching provides a means for efficiently utilizing the existing telephone infrastructure without changing it.

The TCP/IP approach to packet switching, upon which the Internet is based, offers some particular advantages compared to alternative packet switching approaches. IP is a connectionless protocol with globally significant addresses contained in the header of IP packets. This means that IP packets can be treated independently of each other. Much of the TCP/IP functionality, such as packet sequencing, flow control, and error control, has been assigned to TCP. With TCP, end-to-end virtual connections, which set parameters for transferring data without assigning physical network channels, are established between subscribers. With this type of operation, TCP is implemented in the end stations, but not seen by the network itself. This allocation of functions simplifies processing within the network and facilitates interfacing between heterogeneous networks. The widespread acceptance of TCP/IP, compared to other packet switching protocols such as X.25, and the success of the Internet can attributed in part to these advantages.

The global addresses in the IP header provide the information required to route packets through the Internet. The term "routing" usually refers to determining the route that a packet should follow in traversing the network. The term "forwarding" refers to moving a packet from a particular input port of the router (or more generally, the packet switch) to a particular output port. Routing requires the exchange of information among Internet routers using protocols such as the Border Gateway Protocol (BPG) and the Open Shortest Path First (OSPF) protocol. This exchange, which takes place in the control plane as opposed to the data plane, is analogous to common channel signaling in circuit switching networks. Forwarding requires processing of information in the packet header, which is linked to data in the packet payload. This linking is analogous to channel-associated signaling in circuit switching networks.

Problems associated with packet switching networks stem largely from the fact that packet switching causes an inevitable distortion of the stream of data flowing from a data source. With packet switching, data from a source is broken up into packets and headers and trailers are attached to these packets. Of course, the data can be reassembled to its original form at the receiving end if uncorrectable errors are not introduced in the transmission process. Consequently, for data transfers that are not time sensitive, such as most file transfers, en route distortions associated with packet switching are not usually a problem. However, for continuous data sources, such as voice or streaming audio/video sources, distortions introduced by packet switching can be problematic. For example, consider an input data stream 65 shown in FIGS. 4A and 4B. In this case, input data stream 65 entering the packet switching network has a uniform spacing 70 between data blocks 75. A packet switching network can introduce randomly varying delays, which would cause data blocks 75 to arrive at a receiver (not shown) as an output data stream 80 with a variable spacing 85 and possibly out of order. If the random delay variations are too large, then the data may arrive too late to be used by a time sensitive application or too much data may arrive too early to be accommodated by a finite buffer.

Even if the bit error rate is close to zero, the distortions of the data stream described above can produce errors in the received data. Specifically, these errors are the result of lost or out of order packets, discarded late packets, and buffer overflows. For time insensitive applications, these errors can be corrected by the error control features of higher layer protocols, such as TCP. However, these errors can adversely affect time sensitive applications, particularly those applications associated with continuous data sources.

In addition to problems associated with errors, packet switching introduces incompatibilities with existing networks, particularly legacy telephone networks. Generally, telephone networks receive and deliver data at fixed rates, while packet switching networks generally receive and deliver data at varying rates. These incompatibilities can be alleviated by buffering the data flow between networks, which introduces delays.

In packet switching networks forwarding decisions must be made in real-time. This makes the processing required for packet switching more complex and demanding than the corresponding processing for circuit switching.

In addition to the generic packet switching problems described above, there are problems specifically related to the TCP/IP approach. TCP is implemented in the end stations and is not seen by the network. This means that functions that strongly impact network performance, such as virtual connection establishment (and release) and flow control, are outside the control of the network. IP, which is a connectionless protocol and has very limited functionality, is the operative protocol for network elements, specifically network routers. Because of the limitations of IP, it is difficult for a network relying solely on IP to control congestion and to provide a guaranteed quality of service.

Various means have been suggested for dealing with the packet switching problems described above, particularly the problems associated with TCP/IP. One approach is to provide a connection oriented capability through the control plan using Multiprotocol Label Switching (MPLS). MPLS provides a means for establishing virtual connections, which are called label switched paths (LSPs), through the exchange of control messages among network routers. MPLS uses a label distribution protocol (LDP), which is a set of procedures by which network elements inform each other of the meaning of labels used to forward traffic. Transmission resources can be assigned to particular LSPs by exchanging reservation messages among the routers using the Resource Reservation Protocol (RSVP). MPLS also defines generalized labels to be attached to IP packets (and other types of packets). These labels identify that a packet belongs to a particular LSP requiring a certain category of service and can be used by routers to forward packets without relying on the full IP addresses. With MPLS and supporting protocols, it becomes more practical to provide a certain quality of service compared to what can be achieved using IP alone.

The IETF is in the process of extending MPLS so that it can be used in a manner similar to circuit switching, and in particular, the switching of optical channels. Generalized MPLS (GMPLS) provides for implicit labels, which can be used to associate a data flow with a particular channel. With GMPLS, the control plane is separate from the data plane so that control signals and data are in different channels and can be processed separately. This type of operation is similar to common channel signaling approach used in conjunction with narrowband ISDN. One option for GMPLS is to use RSVP with traffic engineering extensions (RSVP-TE) as the label distribution protocol.

SUMMARY OF THE INVENTION

A preferred embodiment of the present invention comprises a multi-service wide-area communications network that combines the advantages of circuit switching and packet switching in an integrated network. Similar to circuit switching networks, the network described here can transport continuous data streams, such as voice or audio/video streams, without distortion. Similar to packet switching networks, the network dynamically shares transmission resources among multiple data flows, which allows this network to efficiently transport bursty data.

A common switching element can perform both circuit switching and packet switching functions. The network that is the subject of this patent application includes a large number of these common switching elements, fiber optic transmission lines interconnecting these elements, and access lines connecting clients and servers to the network. The switching elements and the overall network operate in manner that combines features of both circuit switching and packet switching. This mode of operation is referred to as "dynamic channel switching".

With this dynamic channel switching approach, control signals are separated from the data and transported in common control channels in advance of the data they control. Control and signaling operation can be viewed as a logical extension of generalized multi-protocol label switching (GMPLS) operation. A variable number of data channels are dynamically assigned to each connection through the network. Channels are quickly switched in to accommodate the data flow through a connection and switched out when they are no longer needed. With this approach, a continuous data stream is not altered as it transverses the network and data channels are efficiently utilized even if the data source is bursty.

The network configuration of the present invention is compatible with legacy networks. To take full advantage of this network's capabilities, client and server equipment must be upgraded to support dynamic channel switching. However, most of the benefit of the proposed approach can be achieved with upgrading only server equipment, but not client equipment. In this case, data transport from servers to clients, which represents the bulk of the data flow, will be enhanced, but client equipment, which represents the bulk of subscriber equipment, will not be affected. Consequently, the proposed approach provides a mechanism for facilitating the convergence of circuit switching and packet switching.

The above and other features of the invention, including various novel details of construction and combinations of parts and method steps will now be more particularly described with reference to the accompanying drawings and pointed out in the claims. It will be understood that the particular devices and method steps embodying the invention are shown by way of illustration only and not as limitations of the invention. The principles and features of this invention may be employed in various and numerous embodiments without departing from the scope of the invention.

BREIF DESCRIPTION OF THE DRAWINGS

These and other objects and features of the present invention will be more fully disclosed or rendered obvious by the following detailed description of the preferred embodiments of the invention, which are to be considered together with the accompanying drawings wherein like numbers refer to like parts, and further wherein:

FIGS. 7A–7D illustrate the progression from packet switching operation to dynamic channel switching operation;

Figure 9:
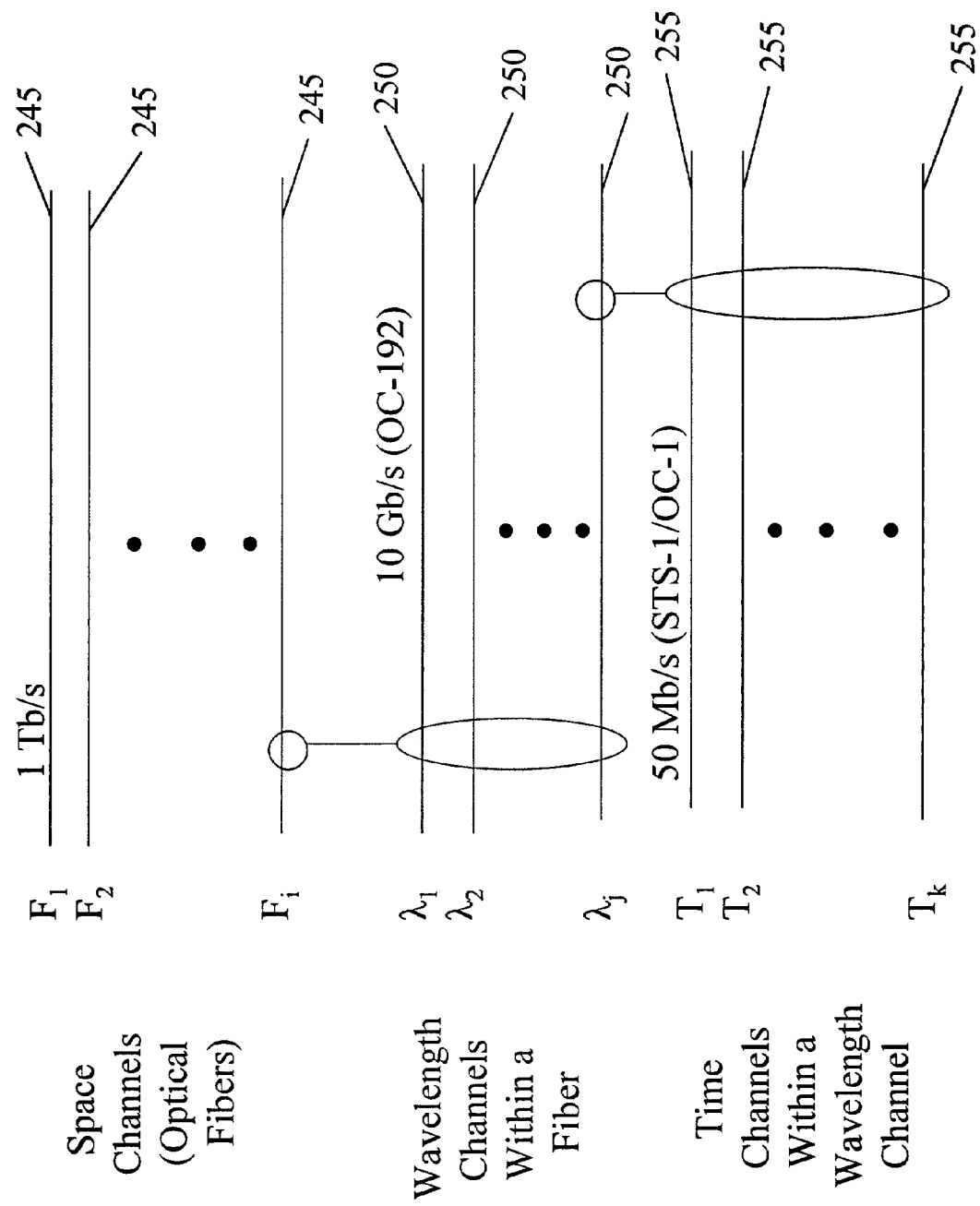
Figure 10:
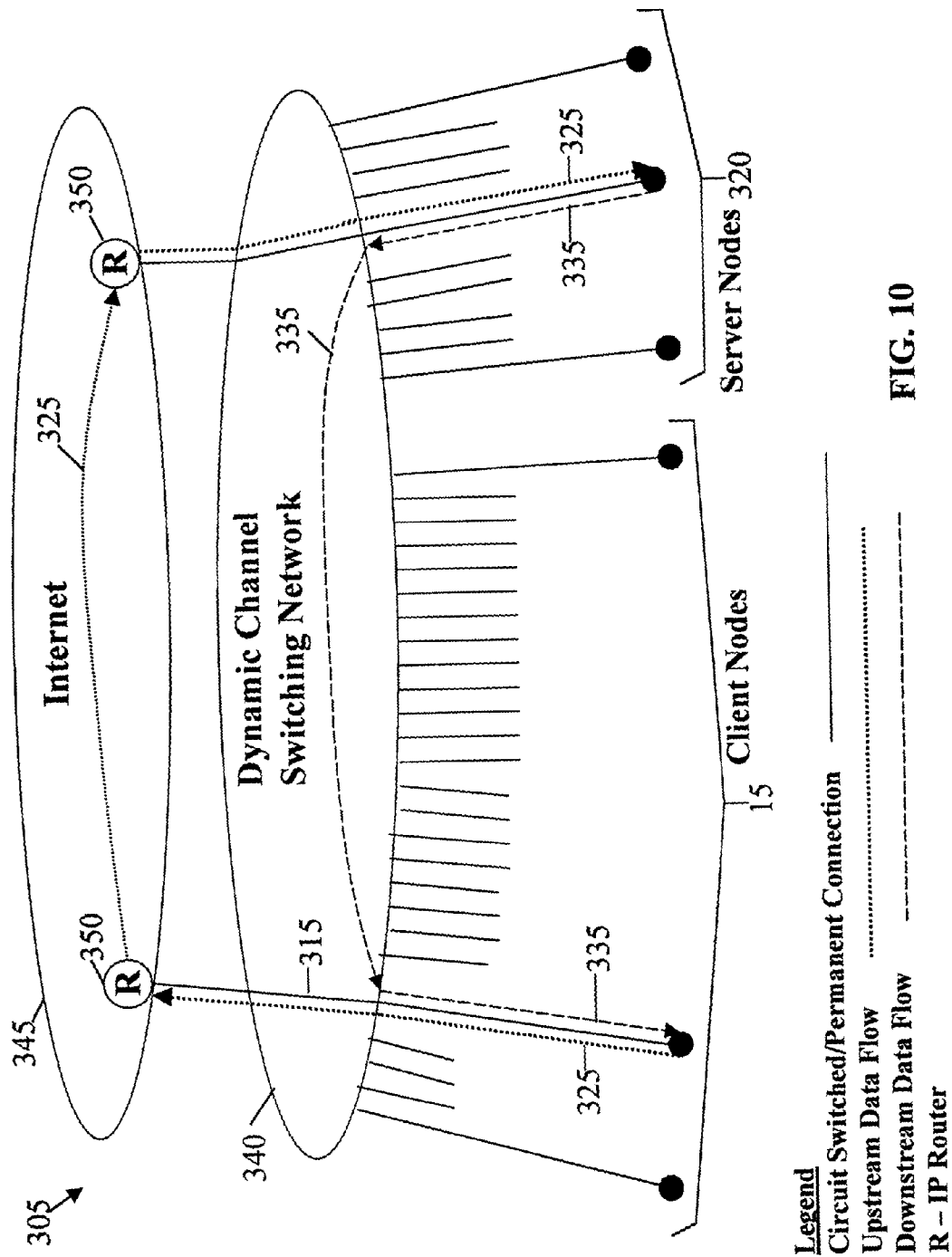

FIG. 9 provides a preferred embodiment of a hierarchy of network channels that can be used in a dynamic channel switching network; and FIG. 10 illustrates a preferred embodiment of backward compatible operation of a dynamic channel switching network with the Internet and legacy clients.

DETAILED DESCRIPTION OF THE PREFERRED EMBODIMENTS

The Concept of Dynamic Channel Switching

If there were no legacy networks and if a communications network were to be built from scratch, then it would not make sense to design separate networks, with different protocols, for voice, video, and data communications. Instead, it would make sense to design an integrated network that would provide a full range of communication services using common protocols and similar modes of operation.

In The Background Of The Invention, significant differences between circuit switching and packet switching were reviewed. However, circuit switching and packet switching also have certain things in common. The present invention utilizes this commonality and discloses how the features of both circuit switching and packet switching can be combined in an integrated network.

The present invention discloses a network architecture based for an integrated services network that is based on dynamic switching of the channels assigned to connections through the network. This network combines the advantages of circuit switching and packet switching. Channels are quickly assigned to a connection to support a particular data flow and quickly released when they are no longer needed. Network control and signaling are based on an extension of the GMPLS concept. With approach, bursty data can be efficiently supported while continuous data streams are transported through the network without distortion.

The network of the present invention is compatible with legacy telephone networks and with the Internet. To take full advantage of this network's capabilities, client and server equipment must be upgraded to incorporate a dynamic channel switching network interface. However, most of the benefit of dynamic channel switching can be realized if only Internet servers are upgraded and clients continue to operate as they currently do. Consequently, the approach of the present invention provides a mechanism for facilitating the convergence of circuit switching and packet switching.

Figure 5:
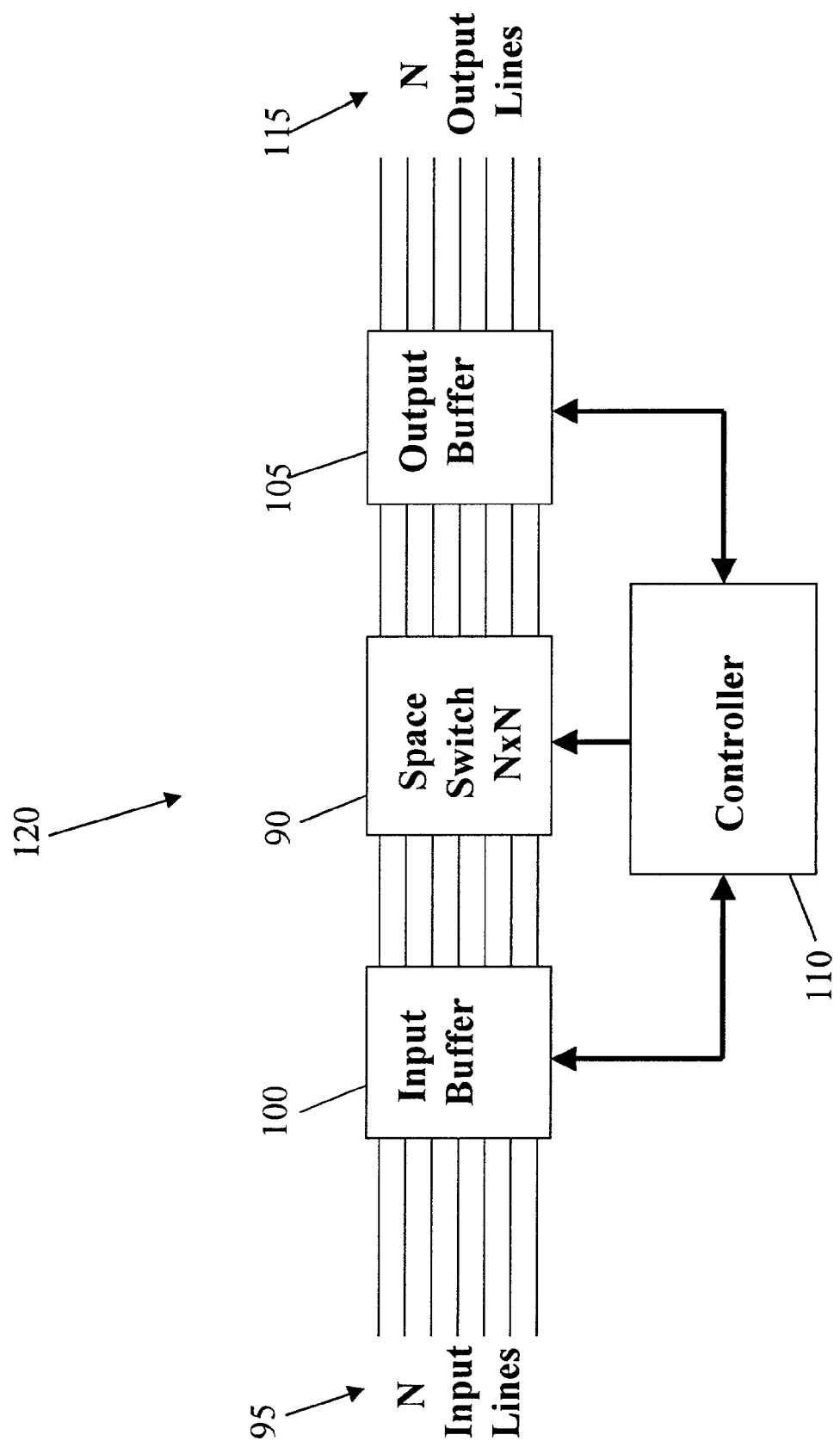
FIG. 5 is a block diagram of a common switching element that can be used to perform circuit switching and/or packet switching.

With both circuit switching and packet switching, signals are switched in both space and time. FIG. 5 shows a common switching element 120 that can be used for circuit switching and/or packet switching. Each of the input lines 95 (or space channels) is broken up into time intervals (or time channels). If an input signal contains multiple carrier frequencies or wavelengths, the signal would be converted to signals on multiple lines prior to switching. Thus, a single fiber containing multiple channels would be equivalent to multiple fibers each containing a single wavelength channel. The switch of FIG. 5 maps space-time channels at its input buffer 100 onto space-time channels at its output buffer 105. Similar to input lines 95, each of the output lines 115 contain multiple time channels. Signals on multiple output lines may be frequency or wavelength multiplexed onto a single output multi-channel line. Controller 110 is configured to control the transfer of data from space-time channels at the input of switching element 120.

Figure 6:
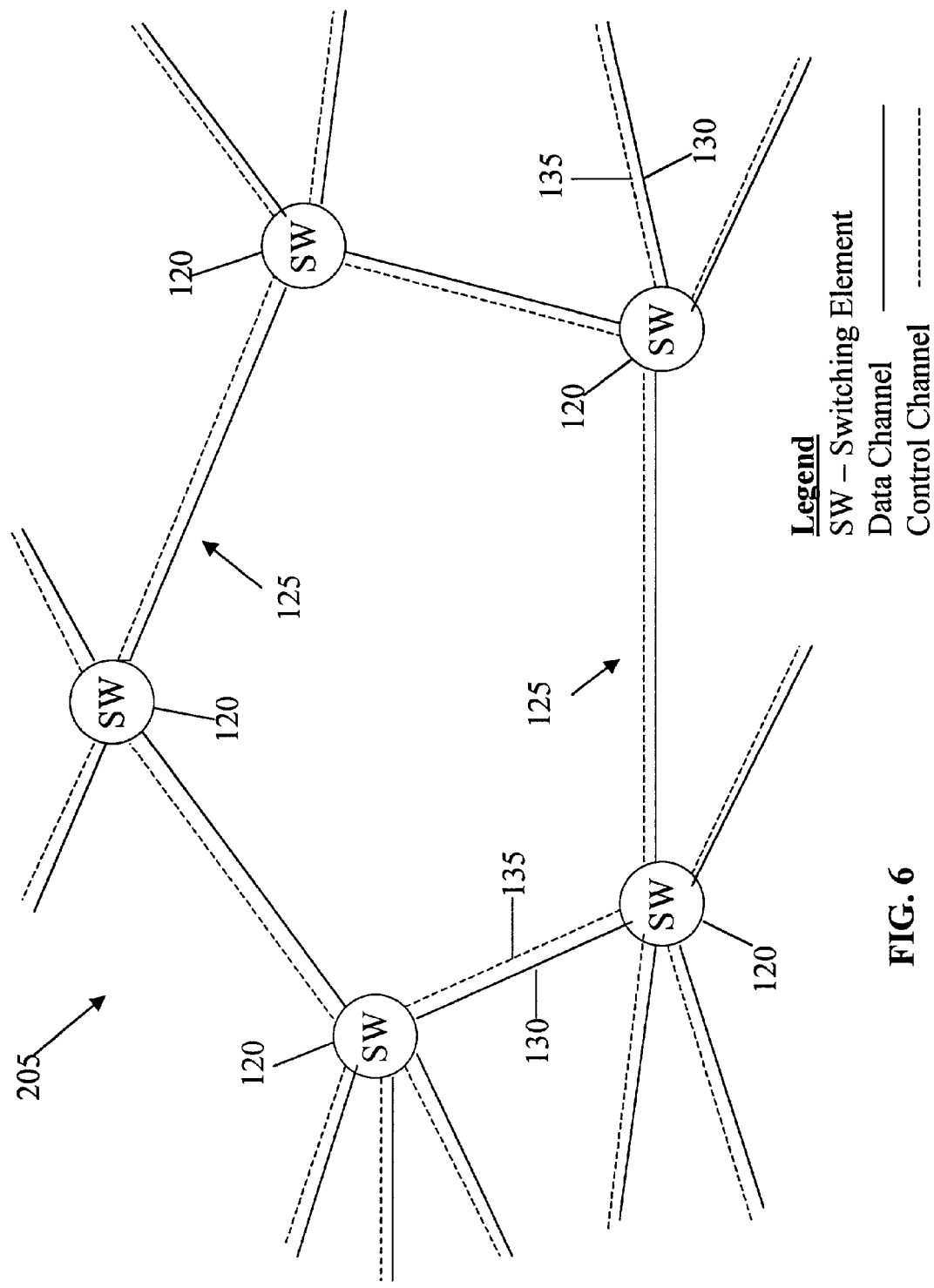
FIG. 6 is a network formed by interconnecting multiple switching elements.

FIG. 6 shows how multiple common switching elements of the type shown in FIG. 5 can be interconnected to form a network. Each node 120, also referred to as a switching element 120, is connected by transmission lines 125 to two or more other nodes 120. FIG. 6 illustrates data channels 130 as solid lines, which indicate connections carrying data, and control channels 135 as dotted lines, which indicate connections carrying control signals. Control signals and data would flow through the same transmission lines, which in this case are fiber optic cables. However, control signals would be assigned to control channels 135 that are separate from data channels 130. All these connections would be full duplex, i.e., they carry data/signals in both directions. However, the capacities of the channels assigned to the two directions may be different. Network nodes would also be connected to nodes outside network 205, e.g., client and server nodes (not shown in FIG. 6). Data and control signals from these external nodes would also be carried in separate channels.

Data on each of the N input lines 95 of FIG. 5 would be stored for a short time interval in input buffer 100. Data can be read out of input buffer 100 in an order different from the order in which it was read in, which would allow time slots to be interchanged. Data is switched from the input lines to the output lines of the N by N space switch 90, with the space switching pattern possibly changing from time slot to time slot. Data exiting space switch 90 is stored in output buffer 105 while it is waiting to be placed on an output line 115. In reading out the data, the output buffer can perform a second interchange of time slots. Thus the switch employs three stages of switching, time switching, space switching and time switching again. With this arrangement of switching elements, blocking within the switch can be eliminated. Thus, data in any time slot on any input line 95 can be placed in any time slot on any output line 115. Of course, there would be a conflict if switch 120 attempted to map data from two or more inputs 95 onto the same space-time channel at output lines 115.

With circuit switching operation, the time slot interchange and space switching functions within each switching element 120 would be controlled based on information provided in the signaling channels. Controller 110 would monitor the signaling channels and would determine the switching pattern for mapping input space-time channels onto output space-time channels. This pattern would includes time slot interchange parameters for all input lines 95 and output lines 115 and space switching parameters for all time slots. With circuit switching, the switching pattern is predetermined for each connection through switch 120. The switching pattern is modified whenever a connection is established or released or when the number of channels assigned to a connection is varied. Controller 110 is configured to send updated interchange and switching parameters to the buffers and the space switch, respectively, whenever the switching pattern is modified.

Packet switching operation of common switching element 120 is similar, but more complex. As with circuit switching operation, time slot interchange and space switching patterns are determined by controller 110. Unlike the circuit switching case, the switching pattern is not predetermined for packet switching operation. Instead the switching pattern must be determined in real-time based on information contained in the packet headers. Controller 110 must read the header of each packet entering the switch. If the header indicates that the packet is part of an existing data flow, the routing through the network should already have been determined and the output line should be available in an existing table. Otherwise the routing of the packet will have to be determined by the routing algorithm, which may involve the exchange of control messages with other switches. Once the output line for the packet is determined, the controller must determine when the packet should be read out of input buffer 100 and output buffer 105. Also, the packet header may need to be modified as the packet passes through switch 120. The real-time processing described above make the latency and throughput requirements on controller 110 considerably more stringent for packet switching compared to the corresponding requirements for circuit switching.

The packet switching operation described in the previous sections and the operation of common switching element 120 described above can be improved upon. Normally, the information required to switch or forward a packet 150 is contained in the packet header 140, which is attached to the data block 145, as shown in FIG. 7A. This means that switching/forwarding decisions must be made in real-time, which imposes strict latency requirements on switching element 120 of FIG. 5. Suppose headers 140 are sent in advance of the data, as illustrated by FIG. 7B. This would allow the switch 120 to determine the switching pattern in advance of receiving the data, which would allow the latency requirements to be relaxed. It would also allow switch 120 to initiate flow control before the actual onset of congestion.

Next, suppose that instead of sending a separate header 140 for each data block 145 (or packet 150), multiple headers 140 are combined into a single header 155, as illustrated by FIG. 7C. This would be particularly advantageous for the case where multiple successive packets 150 are part of the same data flow and are to be sent to the same destination. Also, combining of headers 140 would be advantageous for a sequence of packets 150 that are generated at regular intervals. If multiple headers 140 are combined, controller 110 could determine the switching patterns for multiple data blocks 145 at the same time. This would significantly reduce the computational burden, and the throughput requirement on controller 110 could be significantly relaxed.

Finally, suppose that multiple data blocks are combined into a single data block 160, as illustrated by FIG. 7D. At this point, it would no longer be necessary to break source data into packets 150. Consequently, it would be possible to directly transmit data as it flowed from the data source. If the bit error rate is low enough and sufficient network capacity is provided, then the data stream delivered by the network to the receiver would be the same as the source data stream, except for a small fixed delay.

Figure 8:
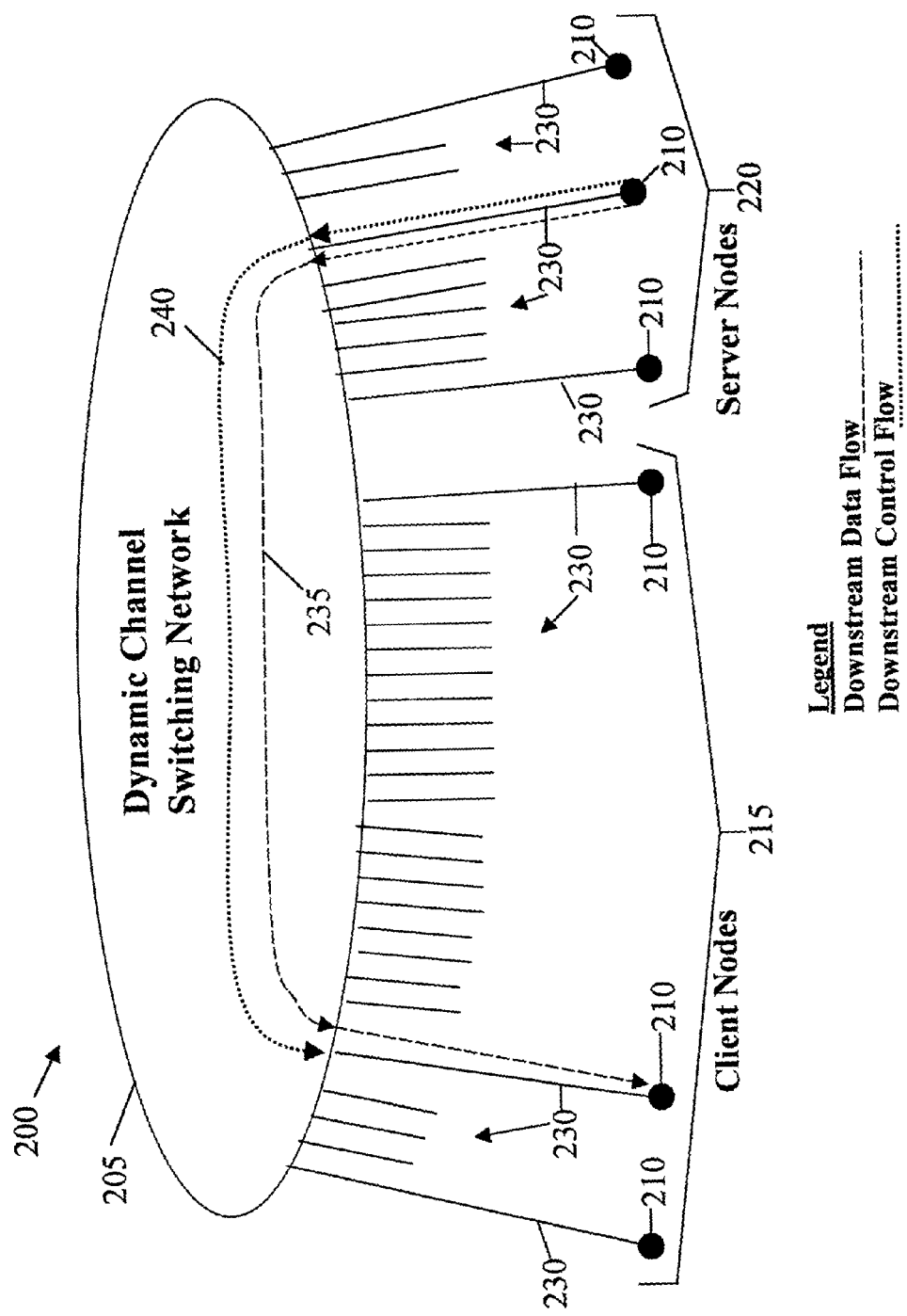
FIG. 8 illustrates the operation of a preferred embodiment of a network based on dynamic channel switching.

Operation of a Network That Combines Circuit Switching and Packet Switching Features As illustrated by FIG. 8, an ideal network 200 would fully connect all subscriber nodes 210 and would transport data without distortion among these subscriber nodes 210 at high data rates and with minimal delays. Subscriber nodes 210 include client nodes 215 and server nodes 220. Some nodes may include both client functions and server functions.

FIG. 8 illustrates the operation of a preferred embodiment of a network 205 based on dynamic channel switching. Network 205 may be constructed using common switching elements 120 of the type shown in FIG. 5 and it may be interconnected as shown in FIG. 6. Although clients 215 can communicate with clients 215 and servers 220 with servers 220, most of the communications are assumed to be between clients 215 and servers 220, and most of the data is assumed to flow downstream, referred to as downstream data flow 235, from servers 220 to clients 215. The flow of information required to control the routing and forwarding within network 205, referred to as downstream control flow 240, is separate from downstream data flow 235. In other words, the control plane would be separate from the data plane, as with GMPLS. A single common signaling channel, similar in function to the ISDN D channel, would be provided to each subscriber (either client 215 or server 220). This channel would be used to control all the connections for the subscriber, and specifically the capacity of the data channels assigned to each data flow. For example, if a server 220 is about to send data to a client 215, then server 220 would use its signaling channel to request the network 205 to assign channels for the data flow. If sufficient network capacity is available, network 205 assigns the channels and notifies the client via the client's signaling channel. After the transfer of data is completed, server 220 notifies network 205 that the channels are no longer needed and can be released. Network 205 can then release the channels and notify client 215.

Subscribers can access network 205 via twisted pair, coaxial cable, or fiber optic lines, or by wireless (radio) links. Each access line must be capable of supporting multiple channels. Network nodes 120 within network 205 are interconnected by fiber optic cables. The network would support a hierarchy of data channels as illustrated by FIG. 9. Different fibers within a cable separate signals spatially and as be viewed as space channels 245. Multiple signals at different wavelengths can be transported within a fiber so that each space channel 245 can be viewed as containing multiple wavelength channels 250. Similarly, the signal at each wavelength can be divided into multiple repetitive time intervals, which can be viewed as time slot channels 255.

The Synchronous Optical Network (SONET) and the Synchronous Digital Hierarchy (SDH) standards define frame structures and data rates for the time-slotted signals used in the proposed network. SONET/SDH frames have a repetition interval of 125 microseconds and data rates that are multiples of 51.84 Mb/s, the fundamental SONET data rate. The fundamental SONET frame, the Synchronous Transport Signal (STS)-1, has a payload that contains approximately 800 bytes and supports a data rate of approximately 50 Mb/s. Each byte within the payload can be viewed as corresponding to a digital signal level 0 (DS0) channel, which can support a data rate of 64 Kb/s. Higher order SONET frames can be formed by byte interleaving of fundamental frames. For example, the STS-3 frame, which is equivalent to the fundamental SDH frame, can be formed by byte interleaving of three STS-1 frames. Higher order SONET/SDH frames are equivalent to a large number of DS0 time slots. The payload of SONET/SDH frames can be segmented into virtual tributaries. For example, an STS-1 frame can be segmented into 28 VT1.5 virtual tributaries, each containing 24 DS0 equivalents.

Other implementations of time based channels within a wavelength channel 250 are possible. For example, a wavelength channel can be divided into Gigabit Ethernet (GigE) frames. In this case, the width the of a frame is variable, but unlike the case with SONET/SDH, the frame cannot be further subdivided.

The space/wavelength/time channels 245, 250, 255 described above are assigned to connections through network 205 and dynamically switched based on the current data transport needs of the connections, hence the name, dynamic channel switching. In response to a connection request from a subscriber (a client 215 or a server 220), network 205 determines a suitable end-to-end route through network 205 and assigns channels along this route. These channels could be assigned indefinitely or for a specified length of time. Assigning a fixed capacity for an indefinite period of time is analogous to a circuit switching operation. Assigning a set of channels for the duration of one or two SONET frames is analogous to a packet switching operation. The capacity of the assigned channels could be asymmetric, with different capacities assigned to the downstream (server 220 to client 215) and the upstream (client 215 to server 220) directions. The establishment of connections and the assignment and switching of channels is controlled by signals sent over a set of dedicated channels, referred to as the control plane. Switches within the network establish switching patterns based on information received via the control plane. Control signals are sent in advance of the data being controlled so that the switching patterns are set up prior to the arrival of the data being switched. An individual control signal controls the switching of multiple data channels.

After the switching patterns are set up, data is switched based on its location within space/wavelength/time channels. Control signals indicate to the switch that data in a particular channel belongs to a particular data flow. Time slots (or virtual tributaries) within a space-wavelength channel are assigned to a particular connection for a certain period of time. Alternately, a number of successive Ethernet frames within a space-wavelength channel are assigned to a particular connection. In the language of GMPLS, the fiber, wavelength, and time slot(s) containing the data would be considered to be "implicit labels". Consequently, the forwarding of data by network switches can be similar to the forwarding of packets using label switching.

For voice operation (typically client 215 to client 215), a subscriber would use the signaling channel to request a connection to another subscriber. The network would provide a single full duplex DS0 channel (or two simplex DS0 channels) through the entire network 200 for the duration of the call, which is similar to the operation of current telephone networks. With this approach, the utilization of the DS0 channel in each direction would be approximately 45%, reflecting the fact that each speaker in a conversation usually talks less than half the time. However, a single DS0 represents an insignificant percentage of the overall network capacity, and consequently, the utilization efficiency for this channel is of little concern. Note that by using a dedicated DS0 channel, voice samples can be transmitted immediately and delays associated with filling a packet with voice samples are avoided.

Typically, files are transferred from servers 220 to clients 215. These server-to-client transfers could be accomplished as follows. Using the signaling channel, the client would request that the network establish a connection between the client 215 and a server 220, which could be viewed as two simplex connections, one in each direction. After the connection is established, server 220 would automatically download a default file(s) to client 215, which could be viewed as the server's "homepage". The downloaded file(s) would contain links to other files on server 220 or to other servers 220. By clicking on a link, client 215 could request a file from server 220. Alternately, client 215 could request a connection with a second server, which would terminate the connection with the first server. Normally, a single DS0 channel would be assigned to the path (simplex connection) from the client to the server (the uplink). This channel would provide more than enough capacity for file transfer requests while using an insignificant portion of network resources. Channels would be assigned to the path from the server to the client (the downlink) only when needed. In other words, the assigned capacity for the downstream direction may be zero. When a server was ready to transfer a file, it would request from the network a channel of a certain capacity, or equivalently a certain number of DS0 channels. Based on channel availability, network 205 may assign a channel(s) with a capacity lower than the requested capacity. After the file transfer is completed, server 220 asks network 205 to release the channel(s). This approach allows the data flow through network 205 to be controlled and would help to minimize network delays and congestion. There may be a delay between when the channel(s) is (are) assigned and when the file transfer begins, or between when the transfer is completed and when channel(s) is (are) released. These delays would reduce the utilization efficiency somewhat but would not adversely affect the transferring of files.

An alternate approach may be used to reduce delays of file transfers. With this latter approach, the file transfer would start right after acknowledgment by the first network node 120 of the server's request for network capacity. The file transfer would continue if sufficient capacity is available along the end-to-end path from the server 220 to the client 215. However, if insufficient capacity is available, the file transfer would be aborted. Then server 220 would then request a lower capacity set of channels and re-start the file transfer from the beginning. This approach would be effective if most initial server requests for channels could be satisfied by the network.

Audio and video data is generated in continuous streams rather than discrete blocks. For directly encoded digital audio/video, the data rates are fixed, but can be very high. If audio/video compression techniques, such as the Moving Pictures Experts Group (MPEG) techniques, are employed, these rates can be significantly reduced. For example, with MPEG-2 compression, National Standard Television Committee (NTSC) video rates can be reduced from 216 Mb/s to between 3 and 6 Mb/s. However, MPEG (and other) compression techniques introduce variations in the data rate, including both frame-to-frame variations and scene-to-scene variations. With a moderate amount of output buffering the frame-to-frame variations can be significantly reduced. For MPEG-2 compression with buffering, the ratio of the peak data rate to the average data rate would typically be in the range of 2:1 to 3:1, depending on the amount of motion represented in the video content and the particular implementation.

For audio/video-on-demand of pre-recorded audio/video, operation would proceed as follows. Using the signaling channel, client 215 would request a connection to an audio/video server 220. Server 220 would then send a menu to client 215. Client 215 selects an audio/video channel and request a particular audio/video stream from server 220. Server 220 would then request from network 205 a downstream channel(s) with sufficient capacity to accommodate the selected audio/video stream. In anticipation of scenes containing more motion and requiring a higher data rate, server 220 would request additional downstream capacity from the network. If sufficient capacity is available, the requested capacity would be assigned to the downstream connection. As the required data rate for the audio/video stream decreases, the capacity assigned to the connection could be reduced. If the sufficient capacity cannot be provide by the network 205, then server 220 would reduce the data rate of the source, e.g., by increasing the size of the MPEG quantization steps, which would result in some degradation in image quality.

With MPEG compression, video data can be segmented into a base layer and an enhancement layer. An MPEG receiver can operate using only the base layer data with the enhancement layer providing improved resolution. This feature can be exploited in the transmission of broadcast (multicast) video or real-time video. Network 205 would need to allocate enough capacity in the downstream direction to accommodate the base layer data for all subscribers receiving the video. If sufficient capacity is available, network 205 would also provide enough downstream channels with sufficient capacity to accommodate the enhancement layer. Otherwise, for some video users, the MPEG receiver would suffer graceful degradation as the image quality would be limited to the quality provided by the base layer. Note that capacity for the enhancement layer could be allocated dynamically based on changing video data rate requirements.

The primary advantage of dynamic channel switching is that it provides a means for transporting data streams without distortion while simultaneously achieving a high channel utilization efficiency for bursty data. Thus, the proposed networking approach combines the advantages of both circuit switching and packet switching. Specifically, the advantages of dynamic channel switching include: elimination of errors caused by lost, late, or out of order packets; efficient utilization of network capacity; reduced computational burden, as a result of relaxed latency and throughput requirements; reduced overhead with the elimination of packet headers and trailers; reduced delays and congestion, with delays associated with filling of packets eliminated and the need for queuing at network switches reduced; and compatibility with existing networks, particularly legacy telephone networks.

The disadvantage of dynamic channel switching is that it is different than the modes of operation used by current networks. Thus, to achieve the full benefits of dynamic channel switching, existing network and subscriber equipment and network operations need to be modified. Mitigation of these disadvantages is discussed below.

Backward Compatible Network Operation

The dynamic channel switching approach described in the previous section is compatible with legacy telephone networks. Dynamic channel switching can be viewed as a special case of the circuit switching techniques employed by these legacy networks. The user-to-network interface (UNI) for control signaling is compatible with the ISDN D channel signaling and network node interface (NNI) signaling protocols can include SS7 as a subset. When interfacing with legacy telephone networks, the speed and flexibility advantages of dynamic channel switching may not be realized. However, the network of the present invention can be configured to interface transparently with legacy telephone networks, and thus be backward compatible with these networks.

Figure 1:
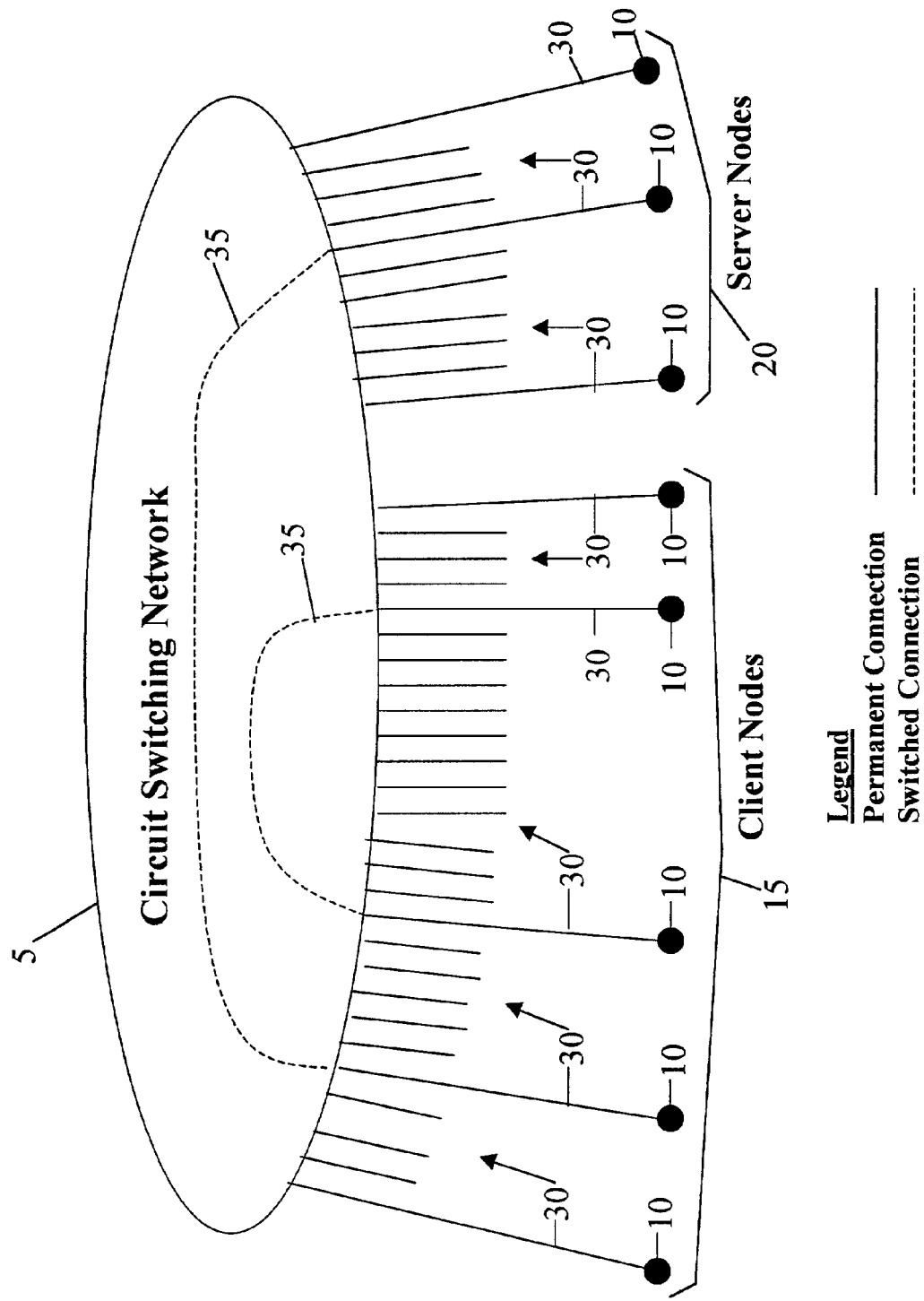
FIG. 1 illustrates the operation of current circuit switching networks.
Figure 2A:
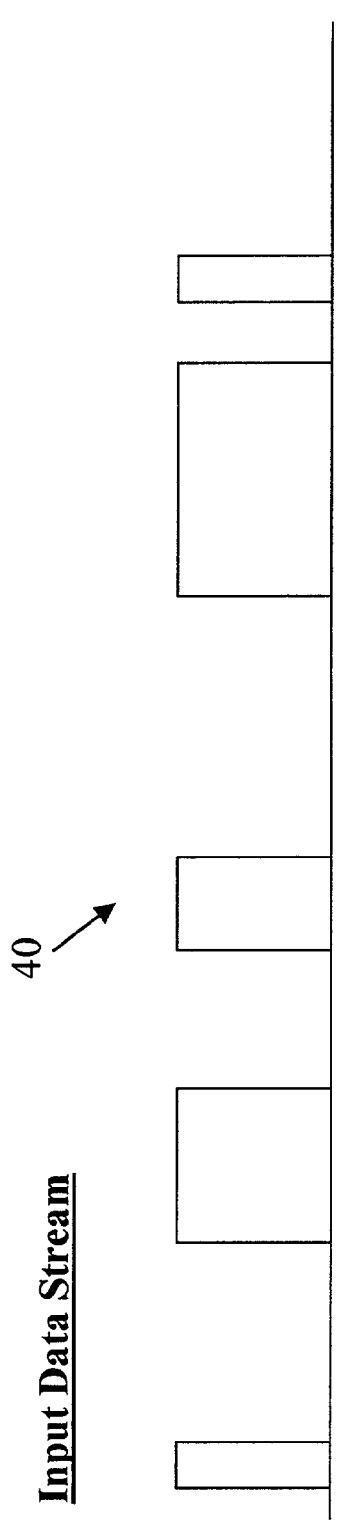
FIGS. 2A and 2B illustrate how data flows through a circuiting switching network without distortion.
Figure 2B:
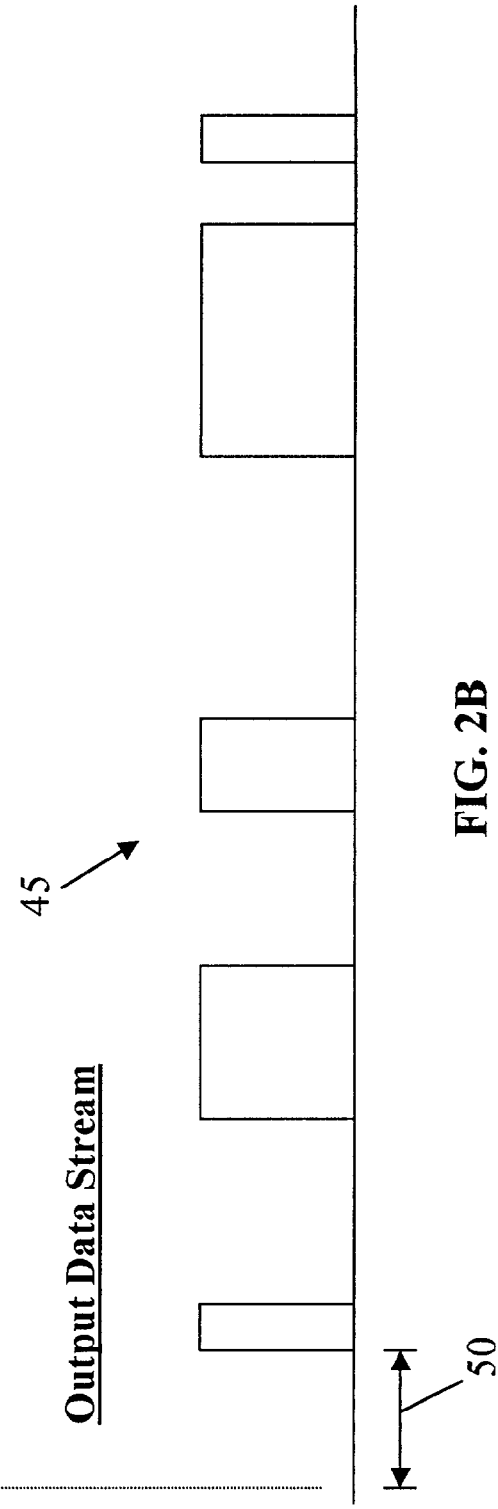
Figure 3:
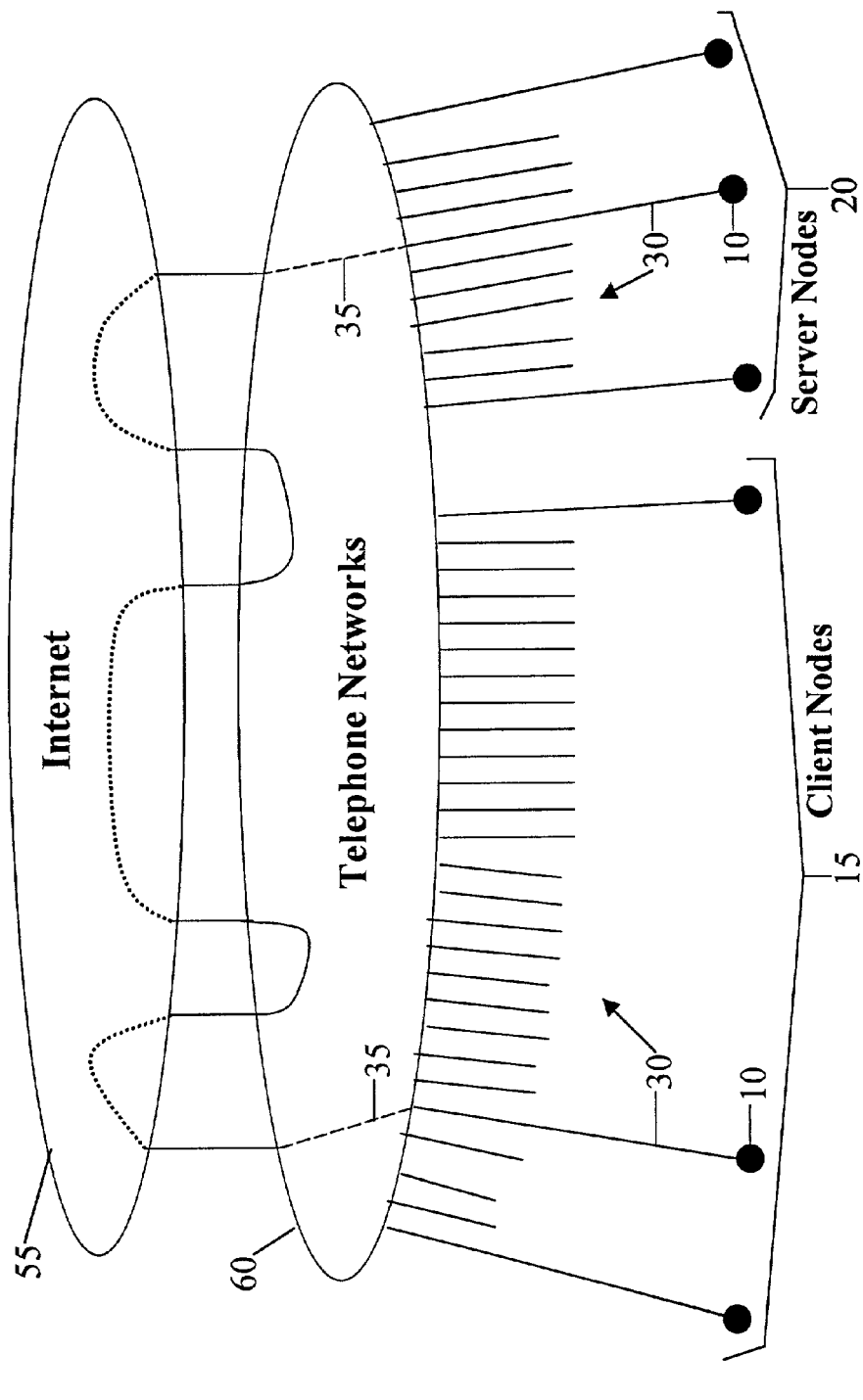
FIG. 3 illustrates the operation of current packet switching networks in conjunction with current telephone networks.
Figure 4A:
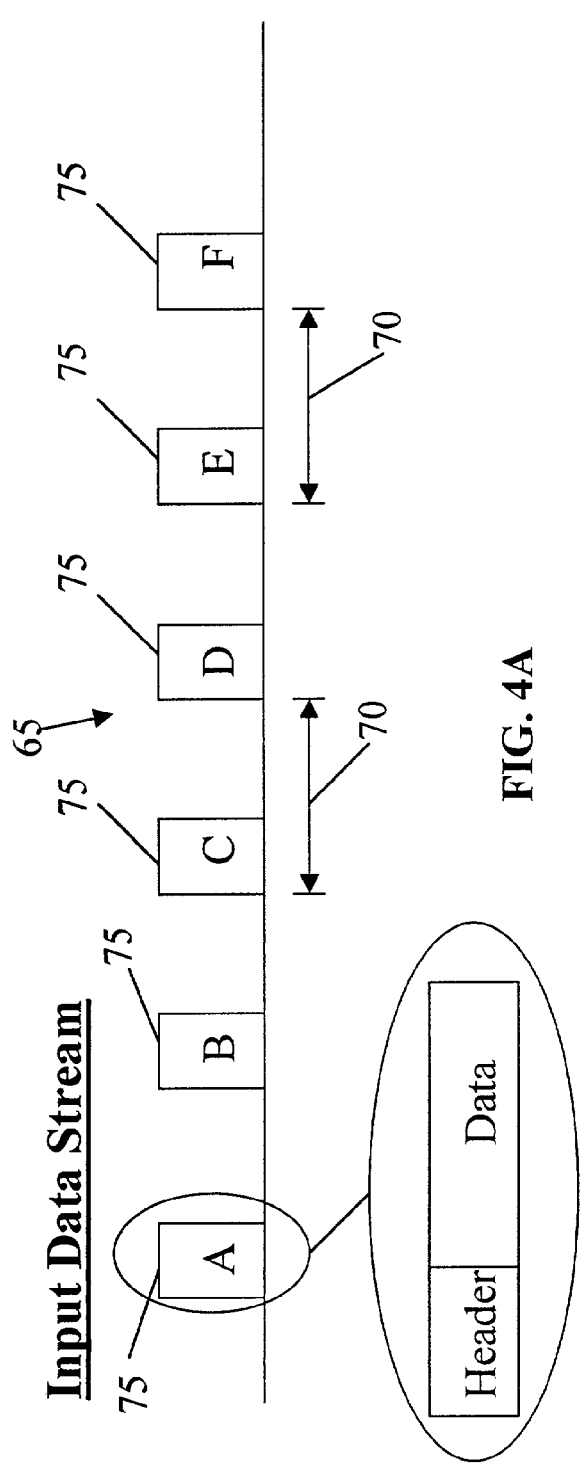
FIGS. 4A and 4B illustrate the distortion of a data stream by a packet switching network.
Figure 4B:
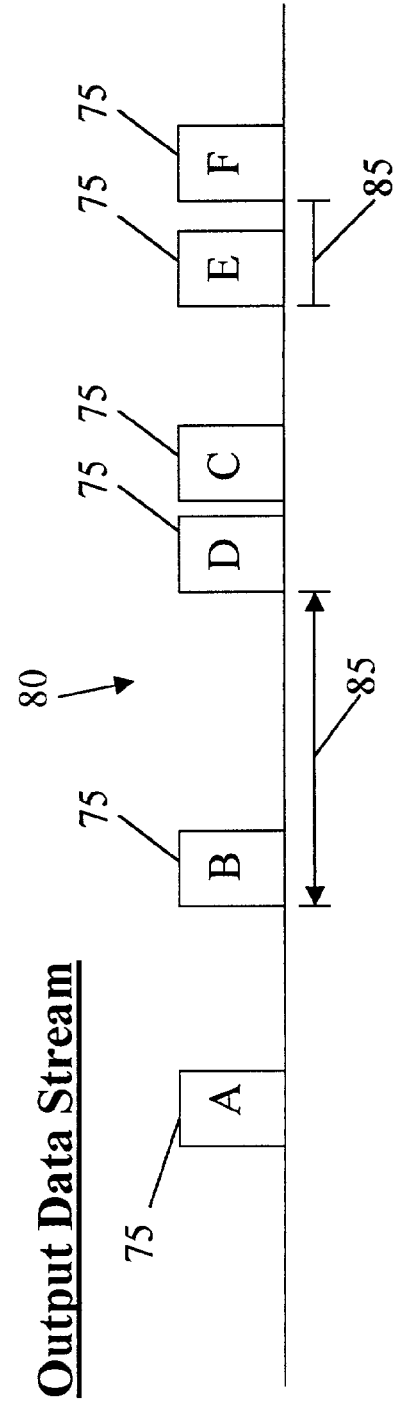

Network 205 of the present invention can also be configured to be backward compatible with current Internet operation. Clients and servers can be directly interconnected through the network of the present invention, which would enable the clients 215 and servers 220 to reap the benefits of dynamic channel switching. However, the clients 215 and servers 220 would need to update their equipment to implement dynamic channel switching protocols. Another mode of operation would be for the network of the present invention to provide conventional circuit switched connections from clients and servers to ISPs, and specifically to Internet routers. This approach would be compatible with legacy clients 15 and servers 20 of FIG. 3, but would not provide the benefits of dynamic channel switching.

A third option, which is illustrated by FIG. 10, provides most of the benefits of dynamic channel switching, but requires equipment modifications for only a small percentage of the subscribers. With this option, equipment within network 340 and at server nodes 320 would be upgraded to include dynamic channel switching features, however, equipment within client nodes 15 would remain unchanged. There would be separate simplex connections for the client-to-server data flow 325 and server-to-client data flow 335. Clients 15 would still be configured to establish circuit switched connections 315 to an ISP and would send IP packets in the upstream data flow 325 through the Internet to a server 320. However, data flow in the reverse direction, the downstream data flow 335, would be able to bypass the Internet 345 and any IP routers 350 within the Internet or elsewhere in network 305. Equipment in server nodes 320 would be upgraded to include dynamic channel switching protocols. Servers 320 would continue to send data using IP packets, but servers 320 would be able to use the control plane to establish data flows through the network and identify which packets belong to a particular data flow. A server 320 would signal network when it was ready to send data, and the network would set up channels to accommodate this downstream data flow 335 prior to receiving the data. Switching elements within network 340 would route packets based on their location within the channel structure and would ignore the information in IP headers. This would make IP superfluous for downstream data flow 335 transmission. Clients 15 would receive IP packets as they currently do and would be unaware that the Internet had been bypassed. Thus, this approach could provide the benefits of dynamic channel switching for downstream data, which represents the bulk of the data flow, without impacting client equipment.

For voice over IP operation, a single DS0 channel would be established in each direction from a subscriber through the network of the present invention to an ISP supporting voice over IP. IP packets containing voice samples would be sent through the Internet and on to the subscriber at the other end of the conversation. Subscribers on both ends would transmit and receive voice samples encapsulated in IP packets. With this mode of operation, the proposed network would be compatible with voice over IP operation, but would not provide any significant benefits relative to current networks. However, since only a single DS0 channel (in each direction) is required, voice over IP operation is not expected to have a significant impact on network resources.

For file transfers, TCP connections would be established between clients and servers. To support TCP connections, each client and server would need to have one or more circuit switched connections through the network of the present invention to an ISP. A client would send a file transfer request to a server through the Internet. A server that was upgraded to support dynamic channel switching would request downstream channels from the network prior to sending the requested file to the client. The file would be broken up into IP packets and transferred through the proposed network bypassing the Internet. The transfer of data from the server to the client would follow either of the two alternate approaches described in the previous section. The client would receive IP packets in the normal way and would be unaware that the packets did not traverse the Internet. After the file transfer was completed, channels would be released back to the network. This approach would speed up the actual transferring of files without tying up network resources for longer than needed.

Audio/video operation would be similar in some respects to file transfers, except that video data is generated continuously rather that a discrete times. The client would request that the network establish a connection with a video server and send IP packets to the server via the Internet. The server would then provide the client with a menu of available audio/video streams. After the client selected an audio/video stream and sent a request for this stream, the server would request from the network a downstream channel(s) with sufficient capacity and start transferring the audio/video stream. The methods for transfer of streaming audio/video from the server to the client would be similar methods described in the previous section for transferring pre-recorded video and broadcast/real-time video. In both cases, audio/video data in IP packets would be sent through the proposed network bypassing the Internet. Again, the client would receive the packets in the normal way and would be unaware the packets did not traverse the Internet.

In summary, the operation of the network of the present invention can be configured for backward compatibility with Internet operation. Most of the benefits of dynamic channels switching, which were listed in the previous section, can be achieved with modifying only server equipment to implement dynamic channel switching protocols. Client equipment does not need to be modified for clients to share in the benefits. Since clients make up the vast majority of network subscribers, most of the benefits of dynamic channel switching can be provided without incurring the cost of upgrading most subscribers.

What is claimed is:

1. A wide-area multi-service communications network comprising:
   multiple switching elements being configured to switch data from input channels to output channels in response to control signals, said multiple switching elements being configured to operate in both circuit switching and packet switching modes of operation;
   transmission lines with multiple channels interconnecting each of said multiple switching elements to at least another one of said multiple switching elements;
   access lines with multiple channels connecting the switching elements to users; and
   control channels being configured to carry control signals, said control signals being configured to dynamically control said multiple switching elements being configured to switch said data, and said control channels being configured separately from each of said input channels and said output channels carrying said data;
   wherein said control signals are configured to arrive in advance of said data being controlled thereby;
   wherein an individual one of said control signals can switch a specified number of said input channels and said output channels carrying said data for a specified length of time;
   wherein said input channels and said output channels carrying said data are dynamically assigned to particular data flows so as to efficiently utilize said input channels and said output channels; and
   wherein continuous and bursty data flows are transported without distortion.

2. A wide-area multi-service communications network according to claim 1 wherein at least one of voice streams, audio/video streams, and computer files are transported directly through said wide-area multi-service communications network without dividing said at least one of said voice streams, said audio/video streams, and said computer files and without inserting the data from said at least one of said voice streams, said audio/video streams, and said computer files into packets.

3. A wide-area multi-service communications network according to claim 1 wherein said data is transported by setting up end-to-end connections through the network, assigning to said end-to-end connections channels with a capacity to accommodate a data rate from a data source such that said capacity of said end-to-end connection channels assigned to a connection between a pair of users is at least one of symmetric, asymmetric, and zero in each direction between said pair of said users, and varying said capacity of said assigned channels as said data rate of said data source varies.

4. A wide-area multi-service communications network according to claim 1 wherein a client operating according to at least one of a standard telephone network interface, a standard Internet protocol, and a current telephone network and Internet procedure is compatible to send data to and receive data from servers having said multiple switching elements.

5. A wide-area multi-service communications network according to claim 1 wherein said data flowing from a client to a server traverses at least one of the Internet and a number of IP routers, while data flowing from a server to a client bypasses the Internet and transverses routers in said wide-area multi-service communications network.

6. A wide-area multi-service communications network according to claim 1 wherein both client data and server data are carried in IP packets, and wherein headers of said IP packets carrying said data from a server are at least one of ignored by the network and used by only a destination client.

7. A switching element, comprising:
   input lines and output lines, said input lines having input channels, and said output lines having output channels;
   an input buffer in connection with said input lines, and said input buffer being configured for storing data received from said input channels;
   an output buffer in connection with said output lines, and said output buffer being configured for storing data prior to placement in said output channels;
   a space switch in connection with said input buffer of said input lines and said output buffer of said output lines, and said space switch being configured to switch data from said input channels to said output channels in response to control signals; and
   a controller having control channels in connection with said input buffer, said output buffer, and said space switch, said control channels being configured to transmit control signals between said controller and each of said input buffer and said output buffer, respectively, and said control channels being configured to provide said control signals to said space switch so as to control data transferred from said input channels of said input lines to said output channels of said output lines;
   wherein said input buffer, said output buffer, said space switch, and said controller are, configured to operate in both circuit switching and packet switching modes of operation; and
   wherein said control signals are configured to arrive in advance of said data being controlled thereby;
   wherein an individual one of said control signals can switch a specified number of said input channels and said output channels carrying said data for a specified length of time;
   wherein said input channels and said output channels carrying said data are dynamically assigned to particular data flows so as to efficiently utilize said input channels and said output channels; and
   wherein continuous and bursty data flows are transported without distortion.

* * * * *